United States Patent
Laukemann et al.

(10) Patent No.: US 7,984,610 B2
(45) Date of Patent: Jul. 26, 2011

(54) HYDRODYNAMIC MACHINE

(75) Inventors: Dieter Laukemann, Velberg (DE); Werner Adams, Crailsheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 464 days.

(21) Appl. No.: 12/265,175

(22) Filed: Nov. 5, 2008

(65) Prior Publication Data
US 2009/0113886 A1 May 7, 2009

Related U.S. Application Data

(63) Continuation of application No. PCT/EP2007/003898, filed on May 3, 2007.

(30) Foreign Application Priority Data

May 5, 2006 (DE) .......................... 10 2006 021 331

(51) Int. Cl.
*F16D 33/06* (2006.01)

(52) U.S. Cl. .......................................... 60/358; 60/357

(58) Field of Classification Search ................... 60/357, 60/358
See application file for complete search history.

(56) References Cited

U.S. PATENT DOCUMENTS

| 3,478,516 A | | 11/1969 | Bonsch et al. | |
| 3,547,231 A | * | 12/1970 | Braun | 60/358 |
| 4,073,139 A | * | 2/1978 | Armasow et al. | 60/357 |

FOREIGN PATENT DOCUMENTS

| DE | 512452 | 11/1930 |
| DE | 677160 | 6/1939 |
| DE | 2614476 A1 | 10/1977 |
| DE | 29903829 U1 | 8/2000 |
| DE | 102 42 736 A1 | 3/2004 |

* cited by examiner

*Primary Examiner* — F. Daniel Lopez
(74) *Attorney, Agent, or Firm* — Taylor IP, PC

(57) ABSTRACT

The present invention relates to a hydrodynamic machine, especially a hydrodynamic retarder, including a bladed primary wheel and a bladed secondary wheel which are arranged opposite of each other axially with respect to their blade configurations such that they jointly form a working chamber. The working chamber can be filled with a working medium for one operating state in order to transmit torque from the primary wheel to the secondary wheel by means of a circulatory flow of the working medium. The working chamber can be emptied of the working medium for a non-operating state in order to prevent a transmission of torque from the primary wheel to the secondary wheel. A suction apparatus is connected with a fluidic connection to the working chamber in order to suck off working medium and/or air from the working chamber for forming a negative pressure in the working chamber in the non-operating state.

15 Claims, 3 Drawing Sheets

HYDRODYNAMIC MACHINE

CROSS REFERENCE TO RELATED APPLICATIONS

This is a continuation of PCT application No. PCT/EP2007/003898, entitled "HYDRODYNAMIC MACHINE", filed May 3, 2007, which is incorporated herein by reference.

BACKGROUND OF THE INVENTION

1. Field of the Invention

The present invention relates to a hydrodynamic machine, especially a hydrodynamic retarder.

2. Description of the Related Art

In the case of hydrodynamic machines, and especially retarders, it is known in the art to take measures in order to reduce the no-load losses. No-load losses shall be understood to be losses which originate in the non-operating state of the hydrodynamic machine in such a way that, unintentionally, a residual torque is transmitted from the primary wheel of the hydrodynamic machine to the secondary wheel of the hydrodynamic machine, and in a retarder from the rotor to the stator, which brakes a respective connected drive apparatus in an undesirable way. This leads to increased fuel consumption in motor vehicles.

Known measures may be, for example, to axially move apart the two blade wheels, which are rotor and stator in the retarder, in the non-operating state in order to thus disturb or prevent a circulatory flow of the residual working medium in the working chamber. Other measures provide for introducing disturbing elements in the working chamber which have the same purpose. Finally, efforts have been made to suck the working chamber empty in the non-operating state, which is the non-braking state in retarders, in order to produce a negative pressure. External pumps, rotary pumps, or reciprocating piston pumps, or suction cylinders have been used for this purpose.

Although the known measures could already contribute to a reduction of the no-load losses, there is still room for improvement. It is especially undesirable that additional energy such as electrical power, is consumed by additional measures or that the constructional efforts for these measures are high.

Reference is hereby made to the following documents concerning the documented state of the art:
DE 512 452 A
DE 26 14 476 A1
DE 677 160 A
DE 102 42 736 A1
DE 299 03 829 U1

What is needed in the art is a hydrodynamic machine in which the losses in non-operating state can be minimized, by a simple constructional configuration and a low energy consumption.

SUMMARY OF THE INVENTION

The present invention provides a hydrodynamic machine, which is arranged as a hydrodynamic retarder, including a bladed primary wheel and a bladed secondary wheel. The two blade wheels are axially disposed opposite of each other with their blade configuration being such that they form a working chamber with each other.

The working chamber can be filled with a working medium. In the operational state of the hydrodynamic machine of the present invention, the working chamber is filled with working medium so that a circulatory flow of the working medium forms in the working chamber which transmits torque or rotary power from the primary wheel to the secondary wheel. In the arrangement of the hydrodynamic machine of the present invention as a hydrodynamic coupling or as a hydrodynamic converter, drive power is transmitted from the primary wheel (then called pump wheel) to the secondary wheel (then called turbine wheel). When forming the hydrodynamic machine of the present invention as a retarder, the primary wheel (then called rotor) is braked in such a way that torque or drive power is transmitted to the secondary wheel (then called stator).

In the non-operating state, which is also called the non-braking state in the hydrodynamic retarder, the working chamber is emptied, the working medium being guided out of the working chamber. In this way, torque transmission or drive power transmission from the primary wheel to the secondary wheel is to be avoided.

A suction apparatus is provided in accordance with the present invention. The suction apparatus stands in a fluidic connection with the working chamber in order to produce a negative pressure in the working chamber in the non-operating state by suction of working medium and/or air. Negative pressure means that the pressure in the working chamber is lower than the ambient pressure, in particular, lower than the pressure against which the suction apparatus works.

The suction apparatus in accordance with the present invention is integrated in the hydrodynamic machine, therefore, no external pump or external suction cylinder is used if connected to the hydrodynamic machine.

The suction apparatus includes a blade wheel. According to one embodiment, the blade wheel is formed by the primary wheel or the secondary wheel. According to an alternative embodiment, the blade wheel is arranged adjacent to the primary wheel and/or the secondary wheel and is driven by the primary wheel and/or the secondary wheel or a shaft carrying the primary wheel and/or the secondary wheel.

The blades of the blade wheel are arranged opposite of a duct in such a way that they generate a conveying effect during rotation of the blade wheel. This conveying effect ensures that a negative pressure is generated at the inlet end of the duct. As a result, working medium and/or air is pumped from the working chamber through the duct and out of the same by the rotation of the blade wheel of the suction apparatus.

The blades of the blade wheel are arranged behind one another in the circumferential direction of the blade wheel and the duct extends in the circumferential direction of the blade wheel. Furthermore, the duct comprises at least one interruption in the circumferential direction of the blade wheel in order to increase the conveying effect. A single interruption is provided in the circumferential direction and the duct extends uninterrupted over the entire circumference from one end of the interruption up to the other end of the interruption, with the interruption extending over only a small arc which has less than 30, 20 or 15° for example. The interruption may extend over less than 10° in the circumferential direction.

The blades of the blade wheel can be opposite of the duct in the axial direction or in the radial direction relating to the blade wheel or relating to the entire hydrodynamic machine. It is understood that other embodiments are also possible. For example, a juxtaposition in a direction oblique to the outside is possible, or an offset both in the axial direction as well as the radial direction.

The duct can be arranged in the housing of the hydrodynamic machine of the present invention, which encloses the primary wheel and/or the secondary wheel, or the duct can be arranged by the same. The duct may be arranged in the form of a side duct, for example, or in the form of a duct laterally delimited by the housing, and may be opened on one side opposite of the blades of the blade wheel of the suction apparatus.

According to one embodiment, the blade wheel of the suction apparatus is formed by the primary wheel or the secondary wheel and the blades of the suction apparatus are arranged on the rear side of the respective blade wheel averted from the working chamber. It is also possible to arrange the blades radially on the outside on the primary wheel and/or the second blade wheel in such a configuration.

According to an alternative embodiment, the blade wheel may be arranged as a separate component to the primary wheel and the secondary wheel, and may be driven by the primary wheel or the secondary wheel, or a shaft of the same. In another embodiment, the blade wheel may be driven by the primary wheel and/or the secondary wheel, and/or a driving shaft, and can be in an interlocking engagement with such a shaft.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION OF THE INVENTION

Figure 1:
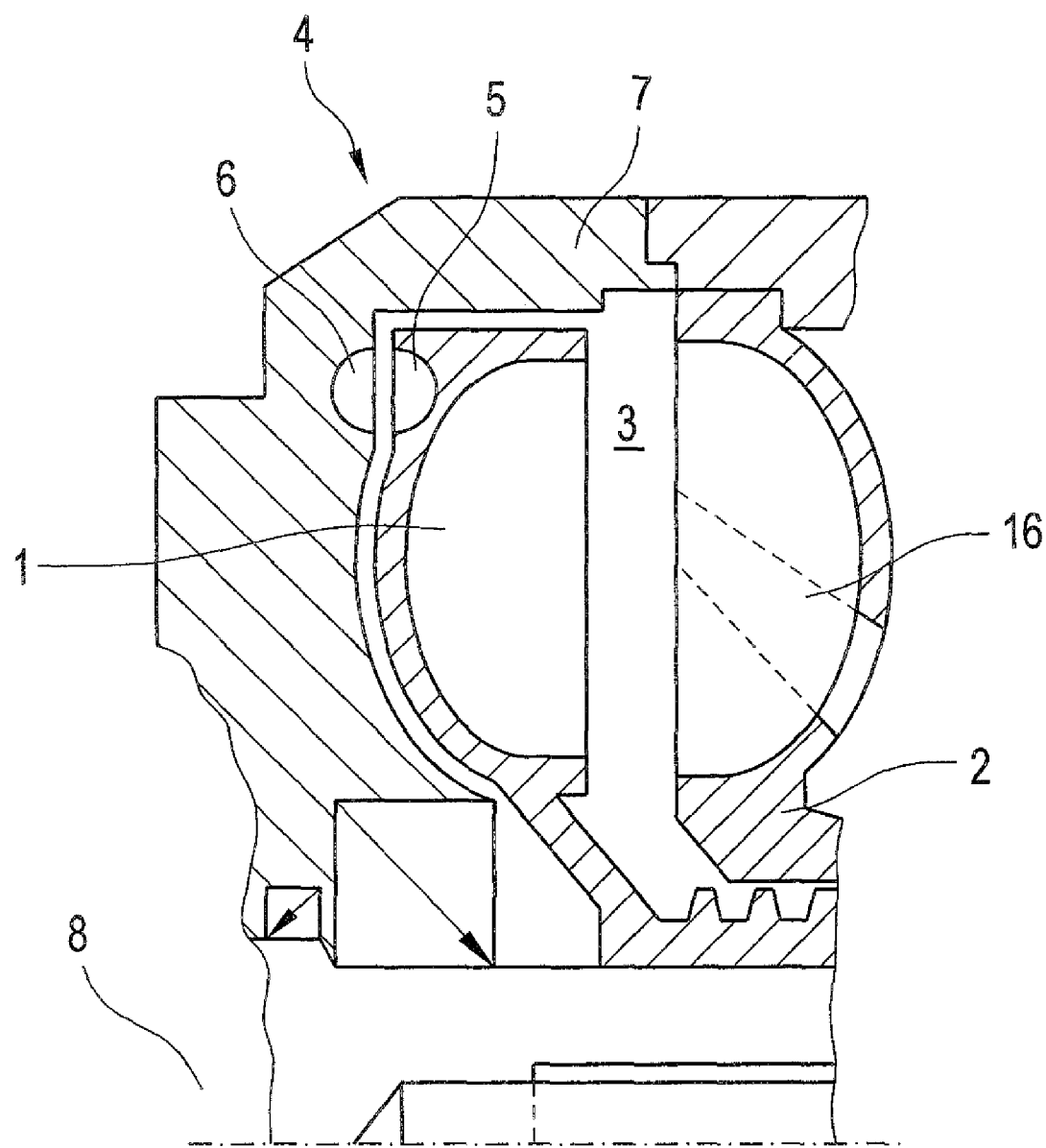
FIG. 1 illustrates an embodiment in accordance with the present invention in which the blade wheel of the suction apparatus is formed by the primary wheel of a hydrodynamic machine, which in this case is the rotor of a retarder.

Referring now to the drawings, and more particularly to FIG. 1, there is shown a hydrodynamic retarder having a revolving bladed primary wheel 1 (rotor) and a stationary bladed secondary wheel 2 (stator). It is shown that rotor 1 is axially displaceable away from stator 2 in order to reduce no-load losses in non-braking operation. It is alternatively or additionally possible to arrange stator 2 axially displaceable away from rotor 1.

Rotor 1 and stator 2, jointly form working chamber 3. Working chamber 3 can be filled with working medium via inlet duct 16 in stator 2.

In the operating state (braking operations), working chamber 3 is filled with working medium up to a desired degree of filling and kept filled. In the non-operating state (non-braking state), working chamber 3 is emptied again and additionally blade wheels (1) and (2) are moved apart axially, as explained above.

Rotor 1 and stator 2 are enclosed by housing 7, with primary wheel 1 (the rotor) being arranged in a rotatable way in housing 7 and secondary wheel 2 (the stator) being inserted in a fixed manner in housing 7.

Primary wheel 1 is supported and driven by driven shaft 8. Shaft 8 can be driven by means of a pinion, which is arranged in an integral manner with same.

Blades 5 are arranged on the rear side of primary wheel 1, or on the side arranged opposite to the side carrying the blade configuration of primary wheel 1, which blades are opposite to duct 6 in the form of a lateral duct in housing 7. Blades 5 form suction apparatus 4 which is used for generating a vacuum or a negative pressure in working chamber 3 in the non-operating state. When primary wheel 1 revolves, blade wheel 5 of suction apparatus 4, which is formed by the rear side of primary wheel 1, moves over duct 6 and thus produces a conveying effect in duct 6.

As is illustrated, blade wheel 5 also jointly forms with duct 6 a toroidal working chamber, of which one axial half each is formed by housing 7 and blade wheel 5. Duct 6 is advantageously provided in the circumferential direction at one point with interruption 15, as can be recognized in FIGS. 4 and 5, which illustrate an axial top view of duct 6. As a result of interruption 15, duct 6 is provided in an axial top view with a horseshoe-like or sickle-like shape, with inlet end 6.1 behind interruption 15, as seen in the direction of rotation of blade wheel 5 (see the arrow) and outlet end 6.2 of duct 6 before interruption 15, as seen in the direction of rotation of blade wheel 5. Suction opening 13 is positioned directly in inlet end 6.1, which stands in connection with working chamber 3. Deviating from FIG. 4, a distance is provided between inlet end 6.1 and suction opening 13, according to FIG. 5.

Pressure opening 14 is provided exactly in outlet end 6.2 or at a distance to the same. Pressure opening 14 usually stands in a fluidic connection with the external working medium circuit (not shown) or a storage container. As is indicated by pressure opening 14', which is shown with the broken line and is arranged exactly in outlet end 6.2, two pressure openings can be provided next to one another, e.g. one with and the other without a distance to outlet end 6.2. The same applies in an analogous manner to the suction opening at the inlet end.

When blade wheel 5 revolves, it conveys pressure medium or air from suction opening 13 to pressure opening 14 and out of pressure opening 14. This leads to a negative pressure in suction opening 13, which results in working medium or air being pumped from working chamber 3 into duct 6 and out of outlet end 6.2. Working chamber 3 is thus emptied completely or nearly completely of working medium.

The flow cross section of duct 6 decreases continually and/or in a discontinuous way starting from inlet end 6.1 to outlet end 6.2. Alternatively or in addition, the radial inner wall of duct 6 can extend in an increasingly radial way further inside starting with inlet end 6.1 or at suction opening 13 up to outlet end 6.2 or up to pressure opening 14. In a similarly additional or alternative way, the depth can also decrease continually in the axial direction of duct 6, starting at inlet end 6.1 and/or suction opening 13 up to outlet end 6.2 and/or pressure opening 14. It is thus achieved that a film forming from working medium is capable even in the case of a partial filling of the duct 6 with working medium to entrain air from suction opening 13 or from working chamber 3 and convey the same out through pressure opening 14. As a result, it is possible to not only pump off working medium from working chamber 3, but also air from working chamber 3.

Figure 2:
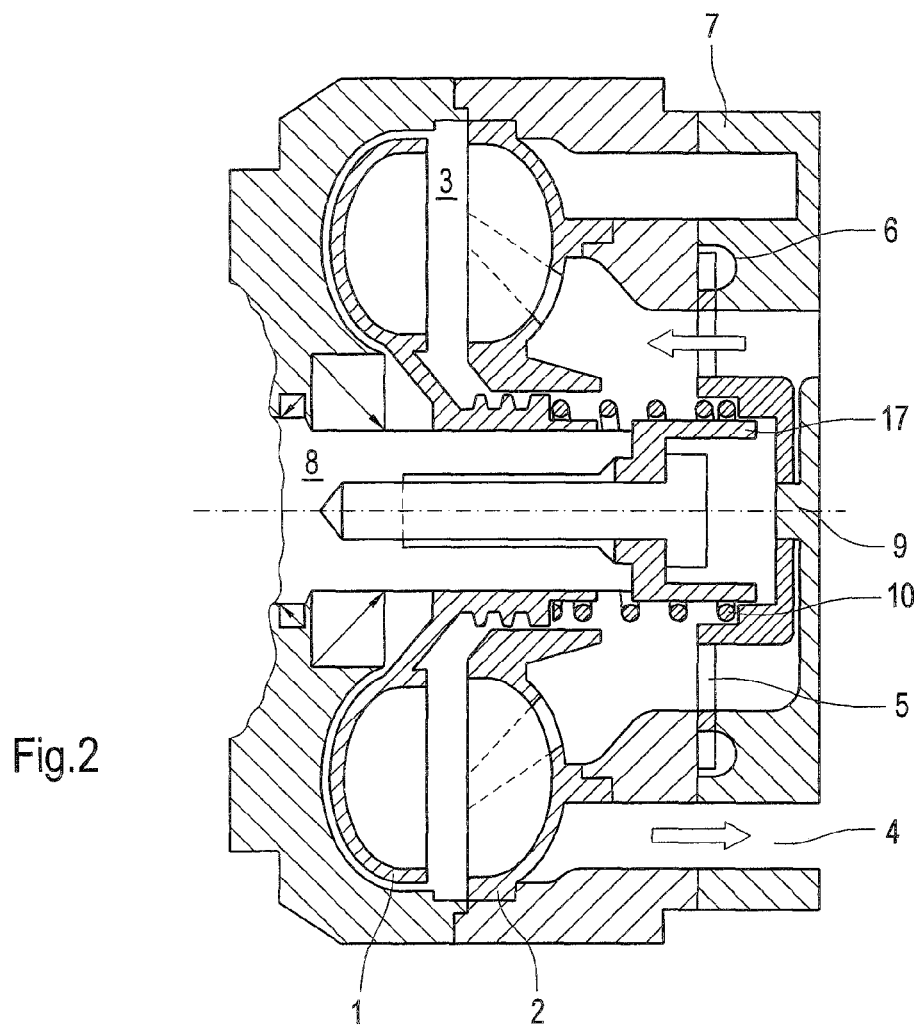
FIG. 2 illustrates another embodiment in accordance with the present invention in which the blade wheel of the suction apparatus is arranged separately from the primary wheel and the secondary wheel of the hydrodynamic machine, which in this case are the rotor and stator of a retarder, and by which the shaft carrying the primary wheel is driven.

FIG. 2 illustrates an embodiment in which blade wheel 5 of suction apparatus 4 is arranged separate from primary wheel 1 and secondary wheel 2. In the illustrated embodiment, blade wheel 5 of suction apparatus 4 is driven by shaft 8 carrying primary wheel 1 and is held on pin 9 on the inside on the housing wall in housing 7.

This support of blade wheel 5 on pin 9 comes with the advantage that blade wheel 5 is held with lower play in the axial direction and/or radial direction in comparison with an embodiment in which blade wheel 5 is held in an overhung manner by shaft 8.

To ensure that blade wheel 5 is held securely on pin 9, it is pressed by means of pressure spring 10 on pin 9.

The arrangement of blade wheel 5 is such that blade wheel 5 and primary wheel 1 enclose secondary wheel 2 (the stator of the hydrodynamic retarder) in a sandwich-like way.

Blade wheel 5 is driven by shaft 8 in such a way that driver 17, which is arranged in the illustrated embodiment in a cup-like way as seen in its cross section, is arranged between blade wheel 5 and shaft 8, which driver is in interlocking engagement with shaft 8 and blade wheel 5. In the illustrated embodiment, driver 17 is screwed onto shaft 8 on the face side and is used simultaneously for guiding pressure spring 10 in the axial direction.

Figure 3:
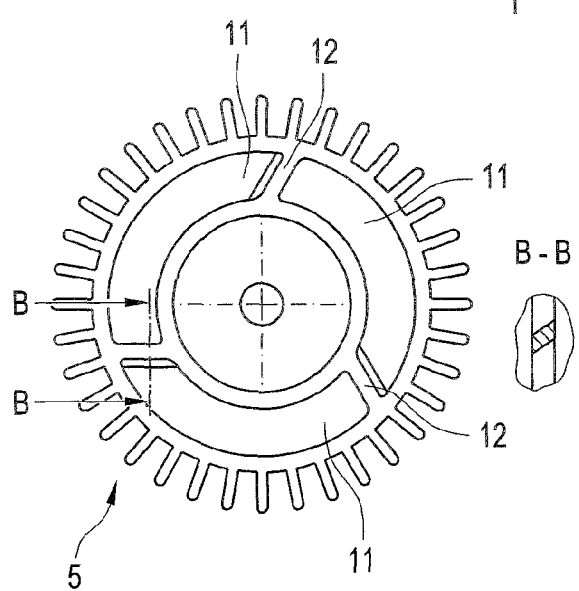
FIG. 3 illustrates a top view in the axial direction on the blade wheel of the suction apparatus of FIG. 2 and a sectional view through profiles of the same.

As is shown in FIG. 3, blade wheel 5 includes a plurality of recesses 11 which are separated by webs 12 from one another in the circumferential direction of blade wheel 5. As a result of recesses 11, the working medium flows before it reaches working chamber 3, see arrows in FIG. 2.

Webs 12 are arranged in such a way that they do not disturb the inflow into working chamber 3 or the outflow out of working chamber 3 by the working medium and especially support the same. Therefore, webs 12 have a fluting which produces a pumping action on the working medium or the flowing air. One example for such a profile is shown in sectional view B-B. As can be seen, the webs are arranged in an inclined way against the plane of a radial section through shaft 8 or blade wheel 5.

In the embodiment, as shown in FIG. 2 and FIG. 3, blade wheel 5 has blades which are rectangular when seen in a cross sectional view in the axial direction. When seen in a top view, blade wheel 5 has blades which are in a star-like shape, as seen in FIG. 3. Alternatively, other blade shapes are possible, e.g. such as are shown in the blade wheel 5 in FIG. 1.

Figure 4:
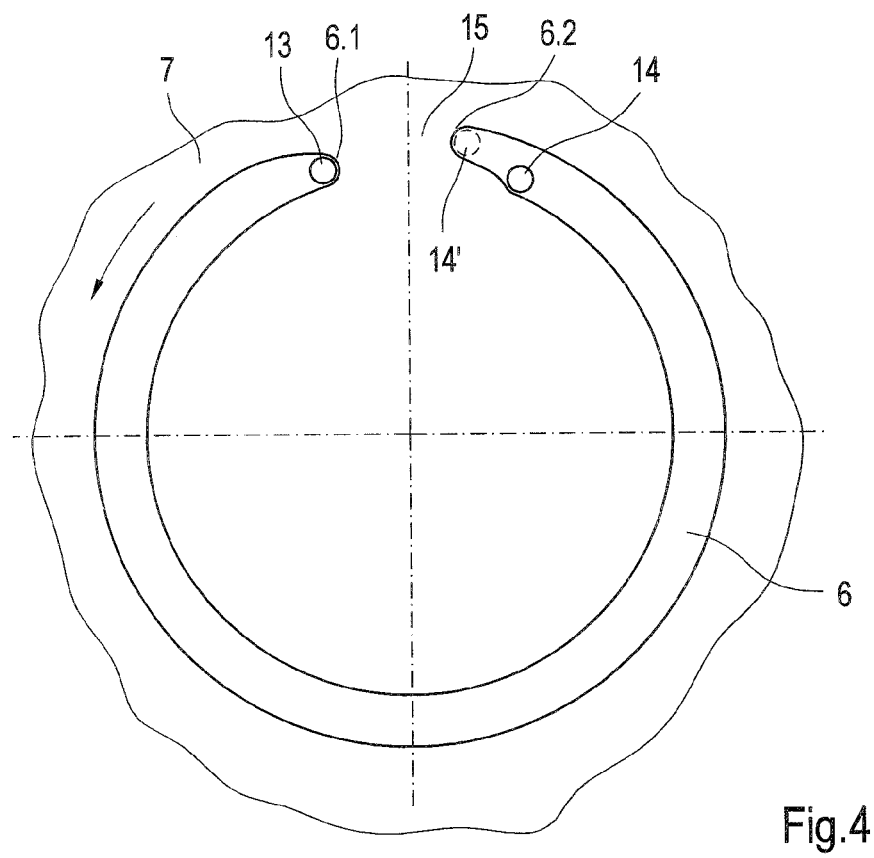
FIG. 4 illustrates a top view in the axial direction on a side duct, as can be arranged in the embodiments according to FIGS. 1 and 2.
Figure 5:
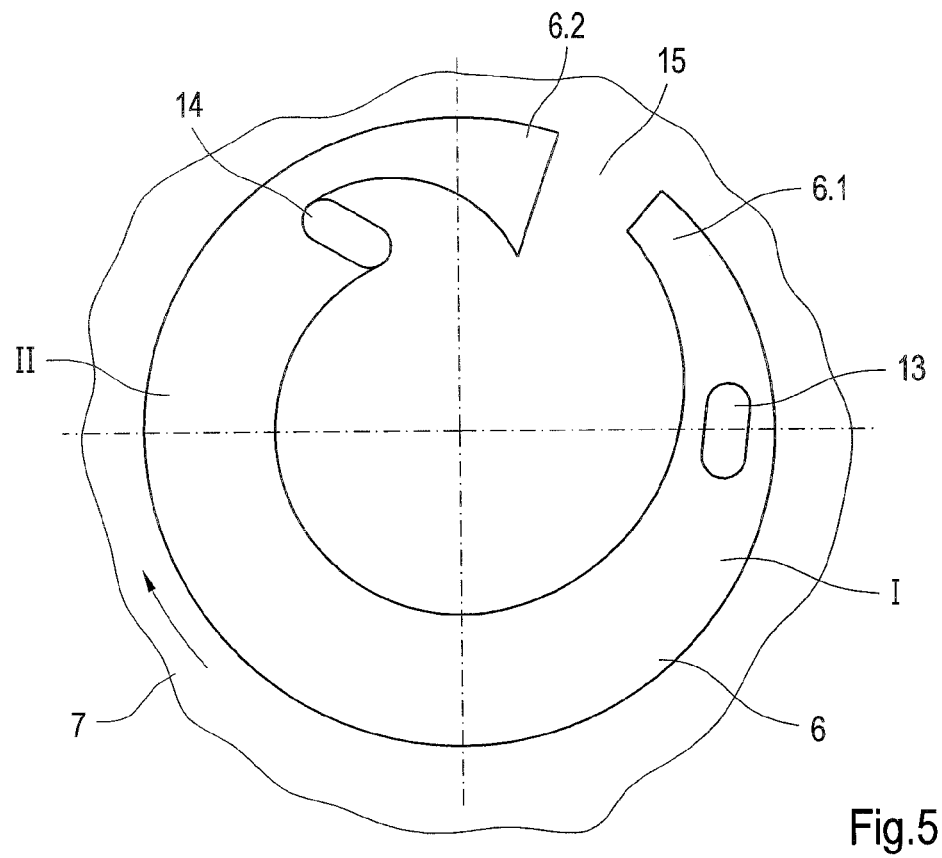
FIG. 5 illustrates an alternative embodiment of a respective side duct.

Duct 6, which again has the shape of a semi-torus, can be arranged in such a way as has been described with reference to FIGS. 4 and 5.

As an alternative to the illustrated embodiment, duct 6 can also be arranged in such a way that it encloses the blades of blade wheel 5 in the axial direction on both sides with a free flow cross section, especially such that the blades, when seen in the axial direction, are arranged in the axial direction centrally in duct 6.

What is claimed is:

1. A hydrodynamic machine having an operating state and a non-operating state, the hydrodynamic machine comprising:
    a primary wheel having blades and a secondary wheel having blades, each of said primary wheel and said secondary wheel being arranged opposite each other axially and said blades of said primary wheel and said blades of said secondary wheel being configured to jointly form a working chamber;
    wherein said primary wheel and said secondary wheel are configured for one of transmitting torque from said primary wheel to said secondary wheel by means of a circulatory flow of a working medium in said working chamber during the operating state and preventing a transmission of torque from said primary wheel to said secondary wheel by means of emptying said working medium from said working chamber in a non-operating state;
    a suction apparatus being integrated in the hydrodynamic machine, said suction apparatus including a revolvable blade wheel having a circumferential direction, a plurality of blades being arranged in the circumferential direction of said blade wheel and one of behind one another on one of said primary wheel and said secondary wheel and adjacent to one of said primary wheel and said secondary wheel, and a shaft at least one of carrying and driving at least one of said primary wheel and said secondary wheel, said blade wheel being driven by one of said primary wheel, said secondary wheel, and said shaft;
    wherein said suction apparatus is in fluidic connection with said working chamber, said suction apparatus being configured to suck off at least one of a working medium and air from said working chamber forming a negative pressure in said working chamber in the non-operating state; and
    a duct having an inlet end opening into said working chamber, said duct including at least one interruption in the circumferential direction of said blade wheel, said blades of said blade wheel being arranged opposite said duct capable of producing a conveying effect in said duct and generating a negative pressure at said inlet end.

2. The hydrodynamic machine of claim 1, wherein said duct includes one single interruption in the circumferential direction of said blade wheel.

3. The hydrodynamic machine of claim 1, further comprising a housing, said housing enclosing at least one of said primary wheel and said secondary wheel, said duct being a lateral duct through said housing.

4. The hydrodynamic machine of claim 1, wherein the hydrodynamic machine is a hydrodynamic retarder, said primary wheel being a rotor and said secondary wheel being a stator.

5. The hydrodynamic machine of claim 1, wherein said blade wheel is formed by said primary wheel, said primary wheel having a rear and a radial outside, said blades of said suction apparatus being arranged on one of said rear side of said primary wheel and radially outside on said primary wheel.

6. The hydrodynamic machine of claim 1, wherein said blade wheel is held in said housing, said blade wheel being driven as a separate component by one of said primary wheel and said secondary wheel.

7. The hydrodynamic machine of claim 6, said blade wheel being driven by said shaft carrying and driving said primary wheel by an at least indirect interlocking engagement between said blade wheel and said shaft.

8. The hydrodynamic machine of claim 7, further comprising a pin, said blade wheel being carried on said pin coaxially to at least one of said primary wheel and said secondary wheel.

9. The hydrodynamic machine of claim 8, further comprising a pressure spring, said blade wheel being held in a rotatable manner on said pin, said blade wheel resting through said pressure spring on one of said shaft carrying said primary wheel and at least one of said primary wheel and said secondary wheel.

10. The hydrodynamic machine of claim 9, wherein said blade wheel includes a plurality of recesses, said working medium flowing through said plurality of recesses into said working chamber in one of the operating state and transition to the operating state.

11. The hydrodynamic machine of claim 10, further comprising fluted webs, said plurality of recesses being separated from one another in the circumferential direction of said blade wheel by said fluted webs, the fluting of said webs having one of a flow-supporting and flow-promoting effect on said working medium flowing through said recesses.

12. The hydrodynamic machine of claim 1, said duct further comprising an outlet end having a pressure opening arranged in one of said outlet end and in the area of said outlet end and said inlet having a suction opening arranged in one of said inlet end and in the area of said inlet end, said duct extending in the circumferential direction of said blade wheel directly in said housing and being interrupted at a predetermined position, said outlet end being formed before said interruption and said inlet end being formed behind said interruption when viewed in the rotation direction of said blade wheel, at least one of said working medium and air being pumped by said revolvable blade wheel from said suction opening to said pressure opening and out of said pressure opening.

13. The hydrodynamic machine of claim 12, said duct further comprising a tapering flow cross section from said inlet end to said outlet end.

14. The hydrodynamic machine of claim 13, wherein at least one of said suction opening and said pressure opening is arranged at a predetermined distance from at least one of said inlet end and said outlet end.

15. The hydrodynamic machine of claim 1, wherein said blades of said blade wheel are opposite said duct in at least one of the radial direction and the axial direction of the hydrodynamic machine.

* * * * *